United States Patent [19]

Kashiwagi

[11] Patent Number: 5,244,053
[45] Date of Patent: Sep. 14, 1993

[54] STRUCTURE OF AUTOMOTIVE VEHICLE SUSPENSION

[75] Inventor: Akihiro Kashiwagi, Hatsukaichi, Japan

[73] Assignee: Mazda Motor Corporation, Hiroshima, Japan

[21] Appl. No.: 817,803

[22] Filed: Jan. 8, 1992

[30] Foreign Application Priority Data

Jan. 10, 1991 [JP] Japan ................................. 3-012461

[51] Int. Cl.$^5$ ............................................. B60K 17/00
[52] U.S. Cl. ...................................... 180/377; 180/378; 280/688; 280/788
[58] Field of Search ............... 180/377, 378, 379, 380; 280/688, 788, 716

[56] References Cited

U.S. PATENT DOCUMENTS 4,826,203  5/1989  Kisima et al. .................... 280/788

FOREIGN PATENT DOCUMENTS 61-59108  4/1986  Japan .
249826  11/1986  Japan ..................................... 180/378

Primary Examiner—Kenneth R. Rice
Attorney, Agent, or Firm—Keck, Mahin & Cate

[57] ABSTRACT

A particular rear suspension supporting structure has a cross member secured to a vehicle body on opposite sides of a tunnel formed in a floor panel. A power plant, including a front power unit located in a front vehicle body portion and a rear axle differential located under a rear vehicle body portion, is located in the tunnel and extends transversely under the floor panel. The supporting structure pivotally supports rear suspension systems at its opposite ends. The cross member includes a center cross member, extending transversely over the tunnel and secured at its opposite ends to the vehicle body on opposite sides of the tunnel, and a pair of side cross members. Each of the side cross members is connected at one end to one end of the center cross member, and extends laterally so as to pivotally support the rear suspension system at another end thereof.

6 Claims, 4 Drawing Sheets

STRUCTURE OF AUTOMOTIVE VEHICLE SUSPENSION

BACKGROUND OF THE INVENTION

1. Field of the Invention

The present invention relates to a suspension for an automotive vehicle and, more particularly, to the structure of a suspension cross member for supporting a suspension arm which connects a wheel support and a vehicle body.

Rear wheel suspension systems for automotive vehicles are supported by a frame to which a vehicle body is bolted or otherwise secured at various points. Such a frame typically includes a pair of side members or frame portions, disposed on opposite sides of the vehicle body and extending in a lengthwise direction of the vehicle body, and front or first and rear or second cross members, connected to the side members. The first cross member is curved upwards at its middle portion so that at least part of a rear axle differential is placed below the first cross member. Additionally, a rear wheel suspension system typically has an A-type upper and trailing arms, pivotally supported by the side frame, and a lower arm, pivotally supported by the front cross member.

2. Description of Related Art

To describe a practical prior art rear wheel suspension support structure, reference is made to FIG. 1. As shown in FIG. 1, a body frame, to which a vehicle body is bolted or otherwise secured at various points, includes a pair of, or left and right, side members or frames a, disposed on opposite sides of the vehicle body. Each of the left and right side frames extends in a lengthwise direction of the vehicle body. The body frame also includes front or first and rear or second cross members b and c, extending in a transverse direction of the vehicle body and connected to the side members a. The front cross member b is curved upwards at its middle portion so as to place part of a rear axle differential i below the curved front cross member b. Each rear wheel suspension typically has an A-type upper arm d, a trailing arm e and a pair of lower arms f and g for each rear wheel. Each upper arm d is pivotally mounted, at its rear end, on one of the side frames a. Each trailing arm e is pivotally mounted, at its front end, on one of the side frames a. Each lower arm f is pivotally mounted, at its rear end, at an underside of a portion, adjacent to the curved middle portion, of the front cross member b. Each lower arm g is pivotally supported, at its rear end, by a sub-member h, which extends from the rear end of one of the side frames a.

A front cross member of a rear wheel suspension support structure of this kind is typically heavy in weight and, therefore, unavoidably increases the weight of the vehicle body. Using a lightweight front cross member in a vehicle body frame, however, lowers the structural rigidity of the vehicle body in its transverse direction. Thus, it is difficult to realize a lightweight vehicle body, which is one object of recent car designs.

SUMMARY OF THE INVENTION

It is an object of the present invention to provide a suspension support structure for an automotive vehicle which allows use of a lightweight vehicle suspension cross member without decreasing the rigidity of a vehicle body in a transverse direction of the vehicle body.

It is another object of the present invention to provide a suspension support structure for an automotive vehicle which provides the vehicle body with an increased structural strength and, therefore, resistance to a collision.

These and other objects of the present invention are accomplished by providing a particular rear suspension supporting structure having a cross member secured to a vehicle body on opposite sides of a tunnel formed in a floor panel in which part of a power plant is located. The power plant includes a front power unit located in a front vehicle body portion and a rear axle differential located under a rear vehicle body portion. The cross member is located so that it extends transversely under the floor panel. The cross member itself includes a center cross member, extending transversely over the tunnel and secured, at its opposite ends, to the vehicle body on opposite sides of the tunnel, and a pair of side cross members, each of which is connected at first end thereof to one end of the center cross member and extends laterally so as to pivotally support the rear suspension system at a second end thereof. The center cross member includes an aluminum beam and is placed so as to be easily broken by a power plant frame, extending under the tunnel, rigidly connecting the front power unit and the rear axle differential.

BRIEF DESCRIPTION OF THE DRAWINGS

The above and other objects and features of the present invention will be apparent to those skilled in the art from the following detailed description of a preferred embodiment thereof when considered in conjunction with the accompanying drawings, in which.

DETAILED DESCRIPTION OF THE PREFERRED EMBODIMENT

Figure 1:
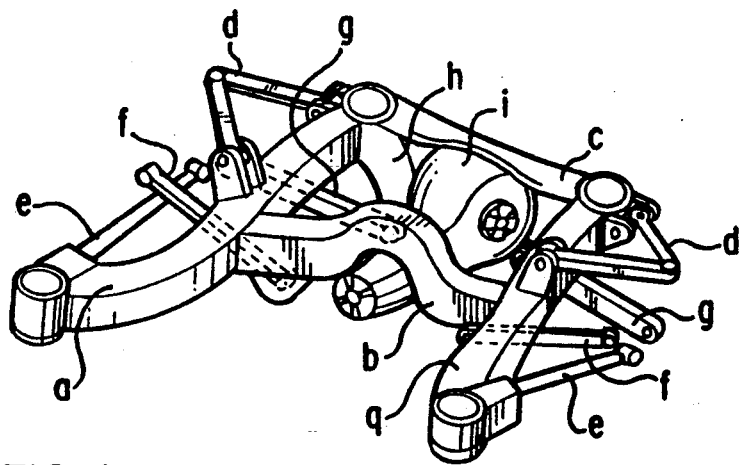
FIG. 1, as noted above, is a schematic perspective view of a conventional rear suspension supporting structure.
Figure 2:
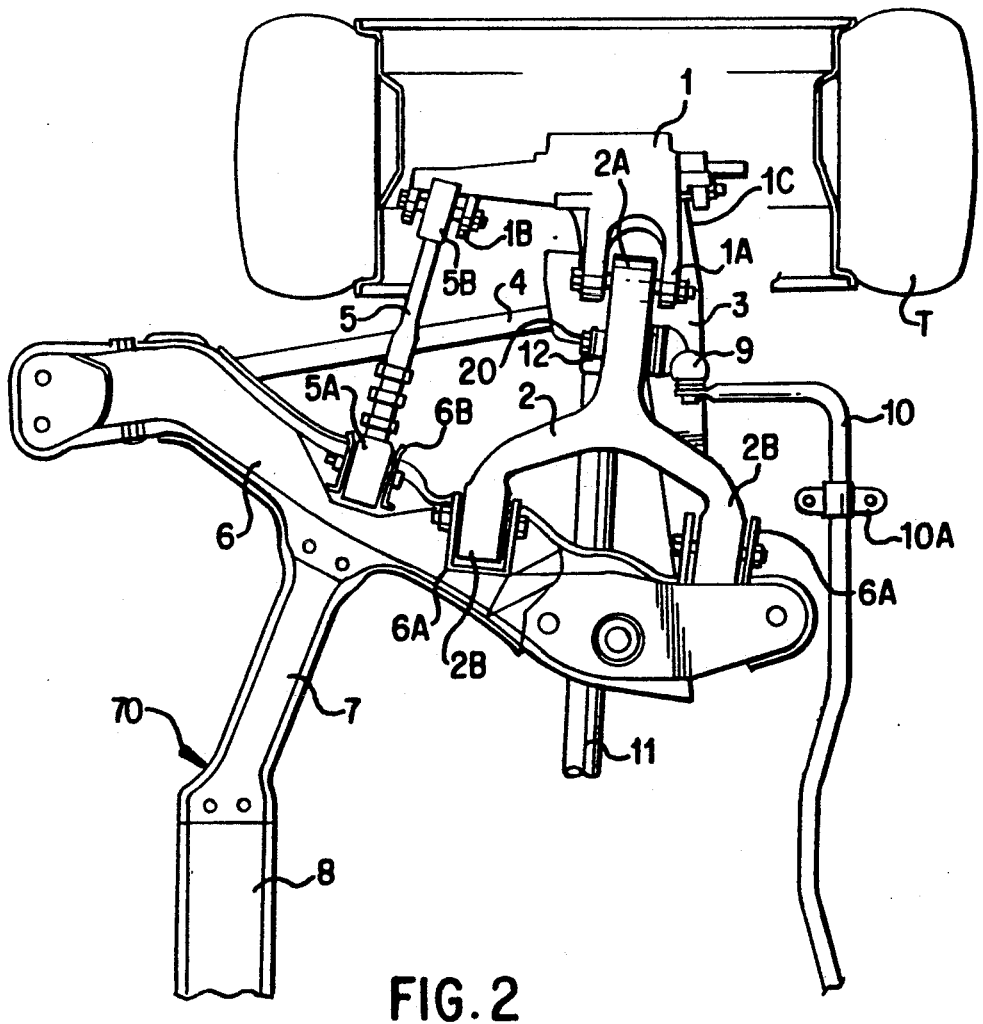
FIG. 2 is a plan view of a rear suspension supporting structure for a right rear wheel in accordance with a preferred embodiment of the present invention.

Referring now to FIG. 2, a rear wheel suspension system in accordance with a preferred embodiment of the present invention is shown. More specifically, a right rear wheel is shown as being supported by a right rear frame. Although only a right rear wheel and frame are shown for clarity, it is to be understood that a left rear frame for supporting a rear left wheel must also be provided; such a left rear frame is the same in structure and operation as the frame supporting the right rear wheel. A rear right wheel suspension support (referred to as a suspension support for simplicity) for the rear wheel T has an A-type upper control arm 2 and a lower control arm 3. The upper control arm 2 has an outer arm portion, which is pivotally supported at its outer end 2A by a U-shaped, outer, upper pivot support 1A of a wheel support 1. The upper control arm 2 also has inner arm portions 2B, separated in a lengthwise direction of the vehicle body. The inner arm portions 2B are pivotally supported by inner upper pivot supports 6A provided on a part of a frame (not shown) to which a vehicle body is secured, such as a rear side frame 6. The lower control arm 3 has an outer arm portion (hidden below the wheel support 1), which is pivotally supported at its outer end by an outer, lower pivot support (hidden below the wheel support 1) of the wheel support 1. The lower control arm also has an inner arm portion, pivotally mounted on a part of the frame which is positioned behind a rear drive axle 11, connecting a rear axle differential (not shown) and the wheel support 1. A tow control link 5 is pivotally supported at its outer end 5B by an outer pivot support IB of the wheel support 1. The outer pivot support IB is positioned in a vertical direction between the U-shaped upper pivot support 1A and the lower pivot support 1C. The tow control line 5 is pivotally supported, at its inner end 5A, by an inner lower pivot support 6B, provided on the rear side frame 6, through an oil containing bush. Such an oil containing bush is well known in the art and may be of any well known type. A trailing link 4 is pivotally mounted, at its outer end, to an outer portion of the lower control arm 3, and is pivotally mounted, at its inner end, to the rear side frame 6.

A suspension cross member 70 extends between and is connected at its opposite ends to the rear side frames 6 which extend in the lengthwise direction and are disposed on opposite sides of the frame. The suspension cross member 70 has a center cross member 8, referred to a "tunnel member," and a side cross member 7, extending between and connected at opposite ends to each rear side frame 6 and the center cross member 8. The suspension cross member 70 is preferably made of aluminum. A shock absorber (not shown), secured at its upper end to the vehicle body 13, is fastened at its lower end 12 to the upper control arm 2 by a bolt 20. As is apparent from FIGS. 2 and 4, the vehicle body 13 overlies the upper control arm 2. The bolt 20 extends rearward from the upper control arm 2 and pivotally connects an end of the control link 9 to the upper control arm 2. The control link 9 is pivotally connected to each end of a rear stabilizer bar 10, supported at several points by brackets 10A secured to the frame.

Figure 3:
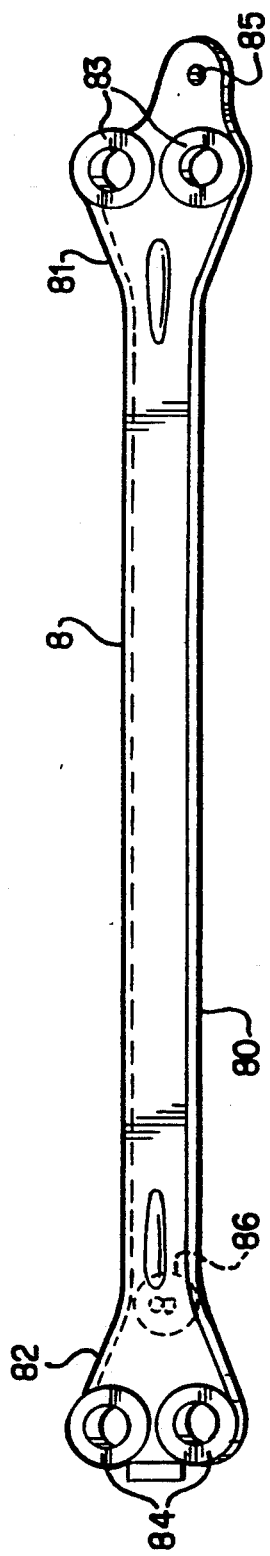
FIG. 3 is an enlarged plan view of a center cross member.
Figure 4:
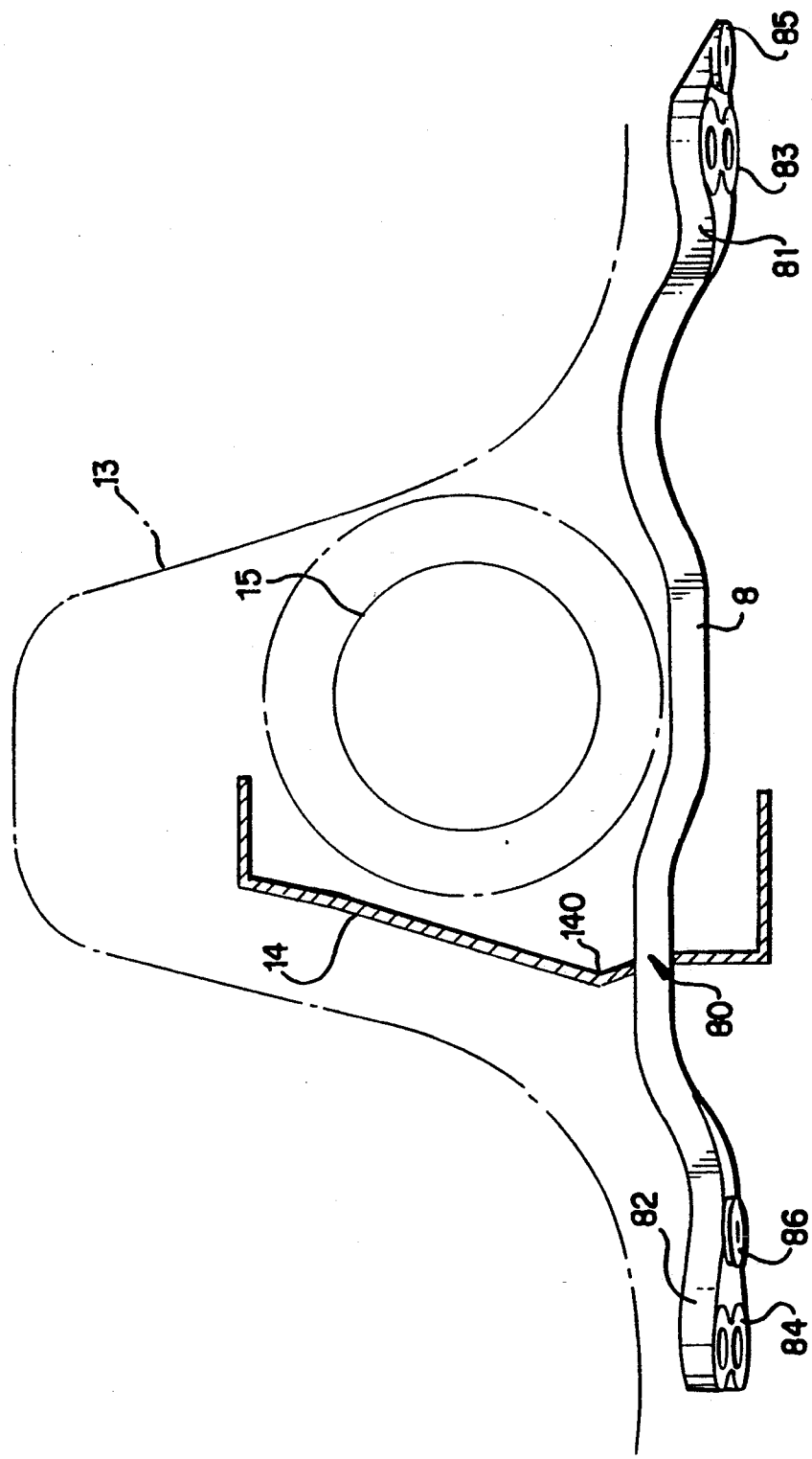
FIG. 4 is a rear view illustrating the center cross member in a certain position relative to a tunnel of a floor panel.

As is shown in FIGS. 3 and 4, the center cross member or tunnel member 8, made of aluminum, is formed at one end 81 with two bolt holes 83 and one screw hole 85 and at another end 82 with two bolt holes 84 and one screw hole 86. The center cross member 8 is disposed so as to pass through an opening 140 formed in a frame 14 for supporting a power plant (see FIG. 6), including a power unit 16, a propeller shaft 17 and the rear axle differential 15, and to extend in a transverse straight line below a front portion of a rear axle differential 15, which is located in a tunnel 13 formed in a floor panel (not shown). During a collision, the center cross member 8 contacts an edge of the opening 140 and deforms and/or breaks. The center cross member 8 is fastened to the floor panel, on opposite sides of the tunnel 13, by bolts passing through the bolt holes 83 and 84 and to the side cross members 7 at its opposite ends by bolts or screws screwed into the screw holes 85 and 86.

Figure 5:
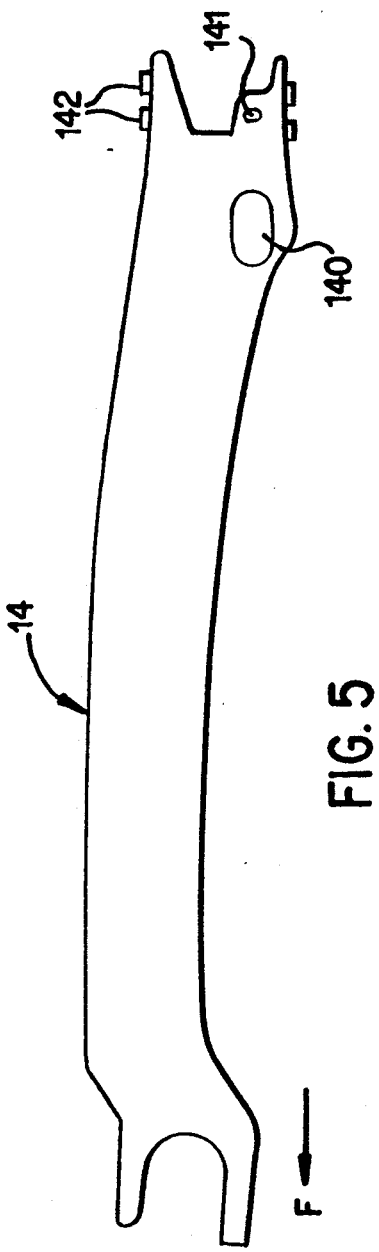
FIG. 5 is a side view of a power plant frame.
Figure 6:
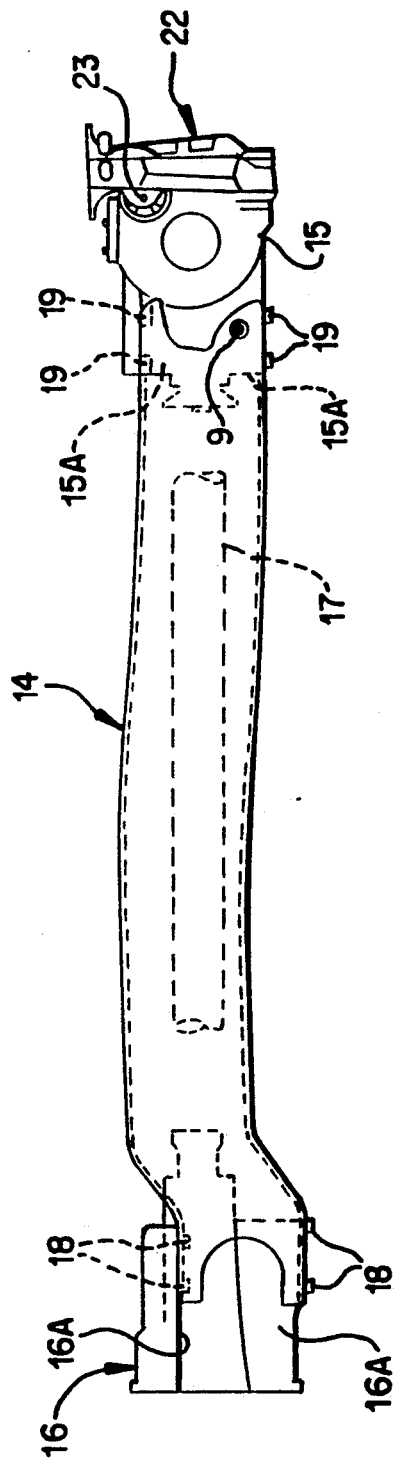
FIG. 6 is side view illustrating the power plant frame in a certain position relative to a power plant.

As shown in FIGS. 5 and 6, the power plant frame 14, which is made highly rigid and resistant to bending but torsionally flexible, is formed so as to have a U-shaped cross section opening sideways. The power plant frame 14 extends between the power unit 16, disposed in an engine room of the vehicle body, and the rear axle differential 15. The rear axle differential is pivotally supported by a sub-frame 22, forming part of the rear portion of the vehicle body, through a connecting pivot pin 23. The power plant is fastened, at its front end, to brackets 16A of the power unit 16 by bolts 18 and, at its rear end, to brackets 15A of the rear axle differential 15 by bolts 19. The power plant frame 14, thus structured, prevents a twisting motion of the power unit 16 about its lengthwise center line from being transmitted to the rear axle differential 15.

The side cross members 7 and center cross member 8 have a high rigidity in the transverse direction, since they are connected to each other through the vehicle body. The center cross member 8, however, is highly resistant only to lengthwise impacts and only weakly resists transverse impacts, due to the fact that it is made of aluminum. Nonetheless, the rear suspension cross member 70, according to the present invention, not only has an increased structural rigidity in the transverse direction but also is capable of absorbing impacts exerted thereon in the lengthwise direction. This enhances the safety of a rear suspension system and enables the rear suspension system to be made light in weight.

In order to increase safety and to enable the rear suspension system to absorb lengthwise impacts more efficiently, it is desirable to form part 80 of the center cross member 8, which is located in the opening 140 of the power plant frame 14, so that it weakly resists lengthwise impacts so that the center cross member 8 is easily broken by the power plant frame 14 during a collision. Alternatively, in order to increase safety and enable the rear suspension system to absorb impacts against the rear suspension system more efficiently, instead of forming the center cross member 8 of aluminum, the center cross member 8 may be formed with a plurality of notches, appropriately distributed in its lengthwise direction, so that it weakly resists transverse impacts.

Because the suspension cross member 70 is made up of three parts, namely, two side cross members 7 and the center cross member 8, and because the center cross member 8 is located in the transverse direction so that it does not interfere with the power plant frame 14 but is hit and broken easily by the power plant frame 14 upon a collision, the rear suspension system is made more safe during a collision.

It is to be understood that although a preferred embodiment of a rear suspension system supporting structure has been described, various other embodiments and variations may occur to those skilled in the art. Any such other embodiments and variations which fall within the scope and spirit of the present invention are intended to be covered by the following claims.

What is claimed is:

1. In an automobile including a body frame, a vehicle body, a floor panel forming part of the vehicle body and defining a tunnel, formed so that it is convex relative to an interior of the vehicle body, a power plant, including a front power unit located in a front portion of the vehicle body, a rear axle differential located under a rear portion of the vehicle body, a supporting structure for supporting a rear suspension system of the automobile through control arms, a power plant frame extending under said tunnel for rigidly connecting said front power unit and said rear axle differential, the improvement comprising a cross member extending transversely under said floor panel for supporting said rear suspension system, a center portion of said cross member extending under said tunnel and being secured to said vehicle body on opposite sides of said tunnel and said power plant frame defining an opening through which said center portion of said cross member transversely extends such that upon a collision of said automobile said center portion of said cross member will tend to be broken by the power plant frame.

2. In an automobile as recited in claim 1, wherein said tunnel surrounds a propeller shaft of said power plant.

3. In an automobile as recited in claim 1, wherein said cross member comprises a center cross portion and a pair of side cross portions, said center cross portion extending transversely under said tunnel and being secured at its opposite ends to said vehicle body on opposite sides of said tunnel, each side cross portion being connected at one end to one end of said center cross portion and extending laterally so as to pivotally support said rear suspension system at its opposite end.

4. In an automobile as recited in claim 3, wherein said center cross portion comprises an aluminum beam.

5. In an automobile as recited in claim 3, wherein said center cross portion is formed with a plurality of notches distributed over its length.

6. In an automobile as recited in claim 1, wherein said power plant frame has a generally U-shaped cross section which opens laterally.

* * * * *